March 22, 1949.  N. F. KUBICEK  2,465,235
PRODUCTION OF HYDROGEN
Filed Sept. 30, 1947
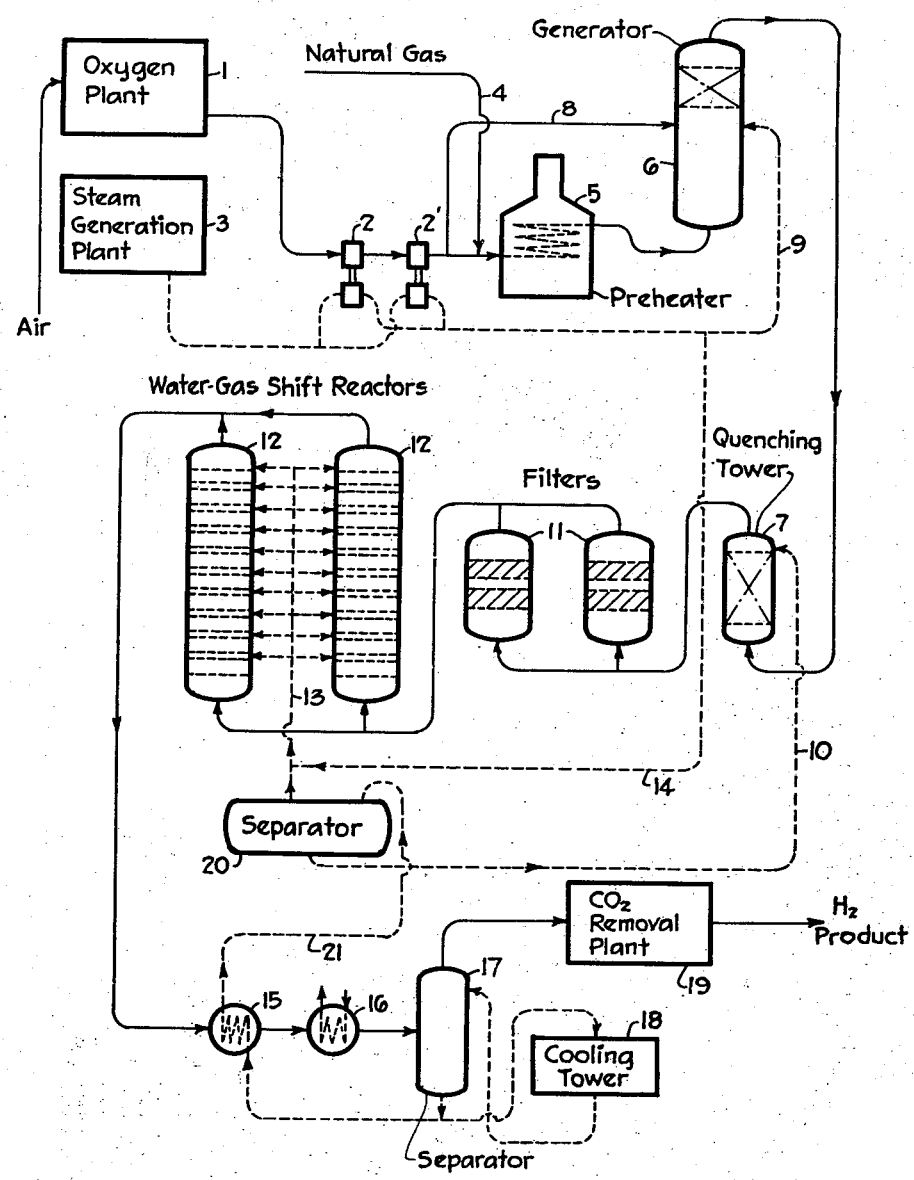
Inventor: Naci F. Kubicek
By his Attorney: C. J. Ott Patented Mar. 22, 1949

2,465,235

UNITED STATES PATENT OFFICE 2,465,235

PRODUCTION OF HYDROGEN

Naci F. Kubicek, San Francisco, Calif., assignor to Shell Development Company, San Francisco, Calif., a corporation of Delaware Application September 30, 1947, Serial No. 776,885

8 Claims. (Cl. 23—213)

This invention relates to the production of hydrogen and more particularly to an improved combination of operations whereby hydrogen may be produced from natural gas with a minimum consumption of steam and with certain other advantages.

There are several known methods for producing hydrogen from natural gas. The economy of these known processes often depends upon the ability to be advantageously integrated with other processes (for example, the use of the hydrogen produced) and also largely upon the size of the plant. See the Petroleum Refiner, August 1946, pages 367-376.

In the process of the present invention hydrogen is produced by the partial combustion of natural gas with oxygen; the mixture of carbon monoxide and hydrogen thus produced is then subjected to the familiar water-gas shift; the carbon dioxide is then removed by the usual technique leaving industrial hydrogen. This process is most advantageous for the production of large quantities of hydrogen such as 30,000,000 cubic feet per day or more. According to the process of the present invention, hydrogen is produced by the mentioned process in the novel manner to be described, whereby economies in equipment, ease of operation and steam requirements are realized.

The process of the invention will be described and explained in connection with a typical operation. To aid in the description, reference will be had to the attached simplified flow diagram wherein some of the apparatus is illustrated diagrammatically by conventional figures not drawn to scale. Steam and water flows are shown as broken lines and gas flows are shown as full lines.

Referring to the flow diagram, oxygen is separated from air in a plant (1) designated the oxygen plant. This unit of the process may utilize any of the known existing processes for the separation of oxygen from air (see the Oil and Gas Journal, March 15, 1947, page 96) however, a Linde-Frankl oxygen cycle is preferred. This known cycle may advantageously be modified by the use of a low pressure expansion engine and an ethane refrigeration process compensate for enthalpy losses. Also the recently developed gas-gas reversing heat-exchanger-accumulator which also serves to remove carbon dioxide and water vapor from the incoming air may be advantageously employed. In some designs the ethane refrigeration system may be eliminated. The oxygen plant preferably produces oxygen of about 96% purity and by-product nitrogen of about 95-98% purity.

The oxygen is compressed to the desired working pressure which may vary from about 100 pounds per square inch up to several hundred pounds per square inch, for example 500 pounds per square inch, by suitable compressors 2 and 2'. One suitable pressure is between 250 and 300 pounds per square inch, for example, 275 pounds per square inch. The compressors may be advantageously run by steam produced in a separate steam generation plant 3, and the exhaust steam may be used in the process as will be described.

The oxygen, after compression, is mixed with natural gas introduced at the working pressure via line 4 and the mixture is preheated in preheater 5. The ratio of the amounts of oxygen and natural gas is approximately that required for the partial combustion reaction:

$$2CH_4 + O_2 = 4H_2 + 2CO$$

and preferably slightly above the stoichiometric amount, for example, 5-10% excess oxygen over the theoretical amount. The mixture is preheated to at least 800° F. and preferably to the maximum temperature (which will depend on the design of the preheater) at which the preheating may be carried out without undue danger of causing combustion (flash-backs). The temperature is preferably about 1000° F., for example, 980° F.

The preheated mixture of natural gas and oxygen is then passed to a refractory lined gas generator (6). The reaction zone of this gas generator wherein the partial combustion reaction takes place may be filled wtih a granular or checker work refractory material such as zirconia, but this is not essential and in the flow illustrated an unpacked reaction zone is used. The temperature in the gas generator is preferably about 2100° F. but may vary from about 2000° F. up to about 2300° F. or somewhat higher. The hot gases from the generator are then passed to a quenching tower 7.

In the reaction of the natural gas and oxygen at the temperature specified a small amount of carbon is produced by side reactions. This carbon, which is carried in suspension in the product gases, is detrimental in the following water-gas shift and is ordinarily quite difficult to remove. In a preferred embodiment of the present invention this difficulty is substantially avoided by simultaneously injecting small amounts of oxygen and steam into the product gases whereby a substantial part of the carbon is reacted to produce gaseous products. In order to aid in reaction of the carbon it is desirable to provide a secondary zone which may be simply an extension of the reaction zone, which secondary zone may if desired be packed with a refractory such as zirconia or a catalyst for the reaction. In the gas generator illustrated in the drawing this secondary zone is integral with the partial combustion zone and occupies the upper part of the gas generator. In order to supply the oxygen required for secondary removal of carbon a part of the oxygen stream is by-passed via line 8. A part of the exhaust steam from the compressors may advantageously be used to supply the steam and may be supplied to the zone via line 9. Reaction of the carbon is not complete but the concentration of carbon may be reduced to such an extent that a simple filter may be used to remove the traces of carbon which remain.

As is well known, the equilibrium in the water-gas shift reaction is determined by the concentration of the reactants present according to the equation:

$$\frac{(CO_2)(H_2)}{(CO)(H_2O)} = K$$

where K at 800° F. has the value of about 9.02. In order to produce hydrogen of relatively high purity it is, therefore, necessary to carry out the shift reaction in the presence of a large amount of steam. The amount of steam required is such that its cost represents one of the most important considerations in plant operation. Consequently, any decrease in the steam that must be produced in the steam plant to meet the requirements of the process represents an important improvement in the economy of the process. Also at a given cost the greater the amount of steam that can be supplied, the better the purity of the hydrogen that can be produced. The process of the present invention owes its advantage largely to the fact that a sizable portion of the steam for the water-gas shift reaction is produced in the system itself by quenching the hot reaction gases with condensate water is furthermore essentially at its boiling point under the prevailing pressure. Since the process is preferably operated under pressure, the temperature of the water used is usually above 212° F. Consequently, very little heat is wasted in heating water and substantially all of the available heat is used to produce steam. The steam produced in this way, particularly if augmented by exhaust steam from the compressors, is sufficient to supply the needs for the water-gas shift reaction, thus obviating the necessity of separately producing steam for this step of the process. The use of additional amounts of steam from any source to increase the purity of the hydrogen is, of course, not precluded.

Thus, as stated above, the hot gases from the gas generator are passed to a quenching tower (7) which may be any conventional quenching tower and may consist simply of a large chamber packed with ceramic rings or similar packing materials. The hot gases are quenched in this tower to a temperature suitable for the water-gas shift reaction, for example, 800° F. The quenching is effected by injecting boiling water (i. e. water at substantially equilibrium with steam at the prevailing pressure) into the tower via line 10. The amount of boiling water required to quench the hot gaseous products is large and is considerably larger than if cold water were used. Thus, when the pressure is about 250 p. s. i. g. and the exit gas temperature is in the order of 800° F., about 101,500 pounds per hour of steam is produced in this step in a plant producing about 3.4 mm. S. C. F. of hydrogen per hour.

The mixture of quenched product gases and steam produced by the vaporization of the boiling water is then passed through a filter 11 to remove any remaining carbon. Filter 11 is preferably composed of a plurality of units arranged so that a unit may be periodically cut out and back-flushed with water to clean it. The filter may be of any conventional design. Beds of used catalysts from the water-gas shift reaction may advantageously be used. While simple filters are preferred, the traces of carbon can, if desired, be removed by any other known method or means.

The mixture of product gas and steam at the desired temperature is then passed to the water-gas shift reactors 12 which may be of any conventional design. Any of the conventional water-gas shift catalysts may be used. One suitable catalyst is, for example, the so-called "brown oxide" catalyst which consists of iron oxide activated by chromium. This catalyst is not poisoned by hydrogen sulfide and can, therefore, be used when the natural gas contains sulfur. Additional amounts of steam are introduced via manifold line 13 into the water-gas shift reactors at intermediate points along the length thereof for the control of the temperature. This steam or a substantial part of it is cycle steam produced within the process itself as will be further explained. Extraneous steam from the compressors introduced via line 14 may also be advantageously used for this purpose.

The product from the water-gas shift reactors consisting essentially of hydrogen carbon dioxide and steam leaves the reactors at substantially the reaction temperature, for example, 800° F. This gas mixture is partly cooled by indirect heat-exchange in exchanger 15, as will be more fully explained and is then passed to a separator 17. Further cooling of the gas may be effected by a cooler 16 and/or by recycling part of the condensate water through a cooling tower 18. The combined effect of these cooling steps is to condense the major part of the steam to hot water, which is withdrawn from the bottom of separator 17. When a cooling tower 18 is used, the top portion of separator 17 may be packed. The remaining uncondensed gas is then passed to a conventional plant 19 for the removal of carbon dioxide, thus, leaving as the final product relatively pure hydrogen under pressure.

The hot condensate water withdrawn from the bottom of separator 17 is indirectly heat-exchanged with the hot gases leaving the water-gas shift reactors by exchanger (boiler) 15. The hot water is brought to the equilibrium boiling point and part of it is vaporized to steam, herein called cycle steam. The mixture of cycle steam and water at equilibrium is then passed via line 21 to separator 20. The cycle steam is withdrawn and used to control the temperature in the water-gas shift reaction, as explained. The boiling water is withdrawn and is passed via line 10 to the quenching tower 7, as explained.

The described system and manner of operation, it will be seen, allows a saving in the steam requirements of the process and, therefore, affords a method whereby relatively pure hydrogen may be produced under pressure with improved economy. As pointed out above, the system is particularly advantageous as compared to competitive methods when the plant is of a size to produce at least 30 mm. S. C. F. hydrogen per day of 90% purity or better.

While the invention has been explained in its preferred embodiment, it is appreciated that certain variations may be made while still utilizing and benefiting by the described invention. Most of these variations are strictly of an engineering nature and their possible advantage depends largely upon the cost of materials, cost of power, etc., at the particular locality in question. For example, part of the boiling water from separator 20 may be utilized in the water-gas shift reaction to control the temperature and part of the steam from separator 20 or additional steam from any source may be introduced into the quenching tower 7. This variation is, however, less preferred because traces of soluble salts in the water, even though it is condensate water, tend to contaminate the water-gas shift catalyst and render it less effective.

I claim:

1. In the production of hydrogen from natural gas by partial combustion with oxygen, conversion of the carbon monoxide produced to carbon dioxide by the water-gas shift, and removal of the carbon dioxide thus formed, the improvement which comprises cooling the product from the water-gas shift by indirect heat-exchange with condensate water as hereinafter specified, further cooling said product sufficiently to condense the steam, heating the condensate by said heat-exchange thus producing cycle steam, separating cycle steam thus formed from unvaporized condensate in equilibrium therewith, vaporizing said unvaporized condensate by injecting it at substantially its boiling point into the hot gases of said partial combustion, passing the mixture of partial combustion gases and steam thus formed through a bed of water-gas shift catalyst, and adding said cycle steam to the mixture while passing through said catalyst.

2. In the production of hydrogen under pressure by partial combustion of natural gas with oxygen under pressure, conversion of the carbon monoxide produced to carbon dioxide by the water-gas shift, and removal of the carbon dioxide thus formed, the improvement which comprises cooling the product from the water-gas shift by indirect heat-exchange with condensate water as hereinafter specified, further cooling said product sufficiently to condense the steam, heating the condensate by said heat-exchange thus producing cycle steam, separating cycle steam thus formed from unvaporized condensate in equilibrium therewith, vaporizing said unvaporized condensate by injecting it at substantially its boiling point into the hot gases of said partial combustion, passing the mixture of partial combustion gases and steam thus formed through a bed of water-gas shift catalyst, and adding said cycled steam to the mixture while passing through said catalyst.

3. In the production of hydrogen from natural gas by partial combustion with oxygen, conversion of the carbon monoxide produced to carbon dioxide by the water-gas shift, and removal of the carbon dioxide thus formed, the improvement which comprises quenching the gaseous product from the partial combustion with condensate water at substantially its boiling point, the amount of said condensate water being sufficient to quench the mixture to a temperature favorable for the water-gas shift reaction, converting carbon monoxide in the quenched mixture of product gases and steam to carbon dioxide by means of the water-gas shift, cooling the product from the water-gas shift by indirect heat-exchange with condensate water as hereinafter specified, further cooling said product sufficiently to condense the steam, heating the condensate by indirect heat-exchange with the product from said water-gas shift thereby producing cycle steam, separating cycle steam thus formed from unvaporized condensate in equilibrium therewith, employing said unvaporized condensate as the above-said condensate water in said quenching step, and contacting the cycle steam with the mixture subjected to said water-gas shift.

4. In the production of hydrogen from natural gas by partial combustion with oxygen, conversion of the carbon monoxide produced to carbon dioxide by the water-gas shift, and removal of the carbon dioxide thus formed, the improvement which comprises quenching the gaseous product from the partial combustion with condensate water at substantially its boiling point, the amount of said condensate water being sufficient to quench the mixture to a temperature of about 800° F., converting carbon monoxide in the quenched mixture of product gases and steam to carbon dioxide by means of the water-gas shift, cooling the product from the water-gas shift by indirect heat exchange with condensate water as hereinafter specified, further cooling said product sufficiently to condense the steam, heating the condensate by indirect heat-exchange with the product from said water-gas shift thereby producing cycle steam, separating cycle steam thus formed from unvaporized condensate inequilibrium therewith, employing said unvaporized condensate as the above said condensate water in said quenching step, and contacting the cycle steam with the mixture subjected to said water-gas shift.

5. In the production of hydrogen from natural gas by partial combustion with oxygen, conversion of the carbon monoxide produced to carbon dioxide by the water-gas shift, and removal of the carbon dioxide thus formed, the improvement which comprises quenching the gaseous products from the partial combustion while under a pressure to about 100 and 500 p. s. i. g. with condensate water having a temperature above 212° F., the amount of said condensate water being sufficient to quench the mixture to a temperature favorable for the water-gas shift reaction, converting carbon monoxide in the quenched mixture of product gases and steam to carbon dioxide by means of the water-gas shift, cooling the product from the water-gas shift by indirect heat-exchange with condensate water as hereinafter specified, further cooling said product sufficiently to condense the steam, heating the condensate by indirect heat-exchange with the product from said water-gas shift thereby producing cycle steam, separating cycle steam thus formed from unvaporized condensate in equilibrium therewith, employing said unvaporized condensate as the above said condensate water in said quenching step, and contacting the cycle steam with the mixture subjected to said water-gas shift.

6. In a process for the production of hydrogen, the combination of steps comprising partly combusting natural gas with oxygen at a temperature between about 2000° F. and 2300° F. to produce a combustion gas containing carbon monoxide and hydrogen, quenching said combustion gas mixture by total evaporation of hot condensate water hereinafter specified, passing the mixture of product gas and steam so formed through a bed of water-gas shift catalyst, cooling the shifted product by indirect heat exchange with hot condensate water, further cooling the shifted product to condense the steam, heating the condensate by said heat exchange to produce cycle steam, separating cycle steam thus formed from unvaporized condensate, injecting said condensate at substantially it equilibrium boiling point into the above-mentioned combustion gas in said quenching step, and adding said separated cycle steam to said mixture passing through said water-gas shift catalyst.

7. In a process for the production of hydrogen, the combination of steps comprising partly combusting natural gas with oxgen at a temperature between about 2000° F. and 2300° F. to produce a combustion gas containing carbon monoxide and hydrogen, quenching said combustion gas mixture by total evaporation of hot condensate water hereinafter specified, the amount of said condensate water being sufficient to quench the mixture to a temperature of about 800° F., passing the mixture of product gas and steam so formed through a bed of water-gas shift catalyst, cooling the shifted product by indirect heat exchange with hot condensate water, further cooling the shifted product to condense the steam, heating the condensate by said heat exchange to produce cycle steam, separating cycle steam thus formed from unvaporized condensate, injecting said condensate at substantially its equilibrium boiling point into the above-mentioned combustion gas in said quenching step, and adding said separated cycle steam to said mixture passing through said water-gas shift catalyst.

8. In a process for the production of hydrogen, the combination of steps comprising partly combusting natural gas with oxygen at a temperature between about 2000° F. and 2300° F. to produce a combustion gas containing carbon monoxide and hydrogen, effecting removal of carbon formed by side reactions in said partial combustion by simultaneously injecting into the hot product gases of partial combustion minor amounts of oxygen and steam, quenching said combustion gas mixture by total evaporation of hot condensate water hereinafter specified, passing the mixture of product gas and steam so formed through a bed of water-gas shift catalyst, cooling the shifted product by indirect heat exchange with hot condensate water, further cooling the shifted product to condense the steam, heating the condensate by said heat exchange to produce cycle steam, separating cycle steam thus formed from unvaporized condensate, injecting said condensate at substantially its equilibrium boiling point into the above-mentioned combustion gas in said quenching step, and adding said separated cycle steam to said mixture passing through said water-gas shift catalyst.

NACI F. KUBICEK.

No references cited.